US008746903B2

(12) United States Patent
Bavdaz

(10) Patent No.: US 8,746,903 B2
(45) Date of Patent: Jun. 10, 2014

(54) METHOD FOR ASSEMBLING A MIRROR PLATE STACK

(75) Inventor: Marcos Bavdaz, Noordwijk (NL)

(73) Assignee: European Space Agency, Paris Cedex (FR)

( * ) Notice: Subject to any disclaimer, the term of this patent is extended or adjusted under 35 U.S.C. 154(b) by 95 days.

(21) Appl. No.: 13/392,453

(22) PCT Filed: Aug. 27, 2010

(86) PCT No.: PCT/EP2010/005283
§ 371 (c)(1),
(2), (4) Date: Mar. 30, 2012

(87) PCT Pub. No.: WO2011/023403
PCT Pub. Date: Mar. 3, 2011

(65) Prior Publication Data

US 2012/0182634 A1 Jul. 19, 2012

(30) Foreign Application Priority Data

Aug. 28, 2009 (EP) .................................... 09168979

(51) Int. Cl.
*G02B 5/08* (2006.01)
*G02B 7/18* (2006.01)

(52) U.S. Cl.
USPC ............ 359/850; 359/855; 359/869; 359/871

(58) Field of Classification Search
USPC .................. 359/850, 855, 868, 869, 871, 883
See application file for complete search history.

(56) References Cited

U.S. PATENT DOCUMENTS

| | | | |
|---|---|---|---|
| 2,135,873 | A | 11/1938 | Jones et al. |
| 5,532,815 | A | 7/1996 | Kipman et al. |

(Continued)

FOREIGN PATENT DOCUMENTS

| | | |
|---|---|---|
| JP | H08-146197 | 11/1994 |
| JP | 2007/271595 | 10/2007 |
| WO | WO 2007/003359 A1 | 1/2007 |
| WO | WO 2007/123294 A1 | 11/2007 |

OTHER PUBLICATIONS

D. de Chambure et al., "The status of the X-ray mirror production for the XMM spacecraft", SPIE Proceedings, No. 2808, pp. 362-375, 1966.*

(Continued)

*Primary Examiner* — Frank Font
(74) *Attorney, Agent, or Firm* — Blakely Sokoloff Taylor & Zafman LLP

(57) ABSTRACT

The invention relates to a method for assembling two or more mirror plate stacks into a rigid unit in turn comprising a plurality of mirror plates and a base plate onto which the plurality of mirror plates are stacked. To improve assembly accuracy of the mirror plates, a base plate is provided with a first mirror plate mounted thereto, a handling tool is provided with a second mirror plate and a spacer is provided to a first surface of the second mirror plate and positioned to align the second mirror plate with the first mirror plate. This alignment is based on a measured position and shape of the first mirror plate to compensate for a deviation from a pre-defined position and shape. The plates are then attached to each other with the spacer; the handling tool is removed and the position and shape of the second mirror plate is measured.

25 Claims, 12 Drawing Sheets

(56) References Cited

U.S. PATENT DOCUMENTS

| | | | | |
|---|---|---|---|---|
| 6,137,579 | A | 10/2000 | Reilley | |
| 6,278,764 | B1 | 8/2001 | Barbee, Jr. et al. | |
| 6,449,826 | B1 | 9/2002 | Laine et al. | |
| 6,711,234 | B1 | 3/2004 | Loxley et al. | |
| 7,077,532 | B1 | 7/2006 | Diver, Jr. et al. | |
| 7,080,915 | B2 * | 7/2006 | Tsuno et al. | 359/883 |
| 7,347,572 | B1 | 3/2008 | Valenzuela et al. | |
| 7,519,153 | B1 | 4/2009 | Moore | |
| 7,978,822 | B2 * | 7/2011 | Windt | 378/84 |
| 2002/0163744 | A1 | 11/2002 | Carreras et al. | |
| 2003/0043456 | A1 * | 3/2003 | Singh | 359/359 |
| 2003/0194054 | A1 | 10/2003 | Ziock et al. | |
| 2004/0032931 | A1 | 2/2004 | Jimarez | |
| 2004/0165165 | A1 | 8/2004 | Yun et al. | |
| 2005/0185306 | A1 | 8/2005 | Bavdaz et al. | |
| 2006/0221474 | A1 * | 10/2006 | Imai et al. | 359/883 |
| 2007/0224518 | A1 | 9/2007 | Yokhin et al. | |

OTHER PUBLICATIONS

Application No. EP 09 16 8979, European Search Report, completed Oct. 20, 2010, 7 pages.

PCT/EP2010/005283, International Search Report and Written Opinion of the International Searching Authority, mail date Apr. 7, 2011, 15 pages.

Zhang, W.W. et al., “Constellation-X Mirror Technology Development,” Proc. of SPIE vol. 6688, 668802-1, (2007) 12 pages.

Chan, K-W. et al., “Opto-mechanics of the Constellation-X SXT Mirrors: Challenges in Mounting and Assembling the Mirror Segments,” Proc. of SPIE vol. 7011, 701114-1, (2008) 9 pages.

Podgorski, W. A. et al., “A Mounting and Alignment Approach for Constellation-X Mirror Segments,” Proc. of SPIE vol. 7011, 701112-1, (2008) 12 pages.

EP 11 16 3175—Extended European Search Report and Opinion, dated Jun. 5, 2012, 5 pages.

JP 2012-525936—Japanese Office Action, mailed Jan. 7, 2014, 2 pages.

Maximilien J. Collon et al., “ Silicon Pore Optics for Astrophysical X-Ray Missions,” Proc. SPIE 6688, Optics for EUV, X-Ray, and Gamma-Ray Astronomy III, 668813, Sep. 20, 2007, pp. 1-12, XP040244752.

EP 09 168 979.4—EPO Communication pursuant to Article 94(3) EPC, mail date Apr. 1, 2014, 5 pages.

EP 11 163 175.0—EPO Communication pursuant to Article 94(3) EPC, mail date Apr. 1, 2014, 4 pages.

De Chambure D et al., “The Status of the X-Ray Mirror Production for the ESA XMM Spacecraft,” Proceedings of SPIE, SPIE, US, vol. 2808, Aug. 7, 1996, pp. 362-375, XP002106458, ISSN: 0277-786X.

* cited by examiner

METHOD FOR ASSEMBLING A MIRROR PLATE STACK

This application is the U.S. National Stage entry under 35 U.S.C. §371 of international application PCT/EP2010/005283, filed 27 Aug. 2010, which claims priority to European patent application EP 09 16 8979.4, filed 28 Aug. 2009. Both applications are hereby incorporated by reference in their entirety.

The invention relates to a method for assembling a mirror plate stack comprising a plurality of mirror plates and a base plate onto which the plurality of mirror plates are stacked. Additionally, the invention relates to a method for assembling two or more mirror plate stacks into a rigid unit.

A particular, but non-exhaustive, application of the invention lies in space missions involving the observation of particular regions of space in the X-ray ranges or for high-energy particles using space telescopes that comprise optical modules based on stacked mirror plates. Nevertheless, the invention can be applied in numerous other fields: UV optics for lithographic equipment, medical diagnostic equipment, material testing and characterization equipment, imaging X-ray fluorescence analyzers, etc.

However, in order to be more concrete, the text below relates mainly to the preferred application of the invention, but without limiting its scope in any way thereto, i.e. it relates to an X-ray optical module, which integrates slumped glass mirror plates.

High precision X-ray optical units that require an optical diameter of several meters are usually not realized using a single large monolithic mirror shell due to manufacturing difficulties and the impractical large size. Instead, a plurality of mirror shells are typically azimuthally divided in small segments, which then have to be assembled into an exact and accurate, yet robust and rugged stack of mirror plates to realize the required resolution and measurement sensitivity of the optical unit.

The thickness of these mirrors plates is typically very small compared to the surface diameter; by way of example thin plates or coaxial shells with a surface area of a DIN A4 sheet and a thickness <0.5 mm are used. This thickness (or thinness) requirement of the mirrors presents an opto-mechanical challenge in mounting them without compromising their figure for focusing since such a mirror plate deforms easily under its own weight and by any inadvertent handling or frictional forces. High-precision measurements with an angular resolution of a few arc seconds require that the thin mirrors are to be aligned and mounted with precision at a level of a about a micrometer or a fraction thereof. Given that the typical baseline design of such mirrors has an axial length of ~200 mm, 1 micrometer error peak-to-valley in low order axial figure error, for example, in sag, results in an error of 2 arc-seconds in the mirror's axial slope, 4 arc-seconds in reflected rays, which is further compounded, in a double-reflection, with a similar error from the secondary mirror. The limit on the amplitude of figure distortion is even more stringent for errors of higher spatial frequency. These requirements are particularly challenging when stacking a plurality of mirror plates due to the potential compounding of errors during the stacking process. Various techniques have been proposed in the prior art in an attempt to satisfy the above-mentioned requirements. US 2003/0194054A1 describes a mirror assembly for medical application. U.S. Pat. No. 6,449,826 B1 disclose a further method for assembling a mirror plate stack for space astronomy. By way of non-exhaustive example, mention can further be made of those described in the following documents, most of which require a temporary mounting structure for the mirror plate assembly: Zhang, W. W. et al. (Constellation-X Mirror Technology Development), 2007, Proc. SPIE, Vol. 6688. p. 668802), Chan et. al. (Optomechanics of the Constellation-X SXT Mirrors: Challenges in Mounting and Assembling the Mirror Segments), 2008, Proc. SPIE Vol. 7011, 701114) and Podgorski et. al. (A Mounting and Alignment Approach for constellation-X Mirror Segments) 2008, Proc. Of SPIE Vol. 7011, 701112-1.

Initially flat sheets, e.g. made of glass, must be formed into the required shape. The flat glass sheets are placed onto a properly shaped mandrel, and then heated in an oven to the temperature, at which the glass sheet softens and bends under its own weight. The temperature is low enough for the glass sheets to keep their surface finish, but high enough for the sheets to conform to the shape of the supporting mandrel.

An alternative approach utilizes gas pressure for forming the glass plate. The glass plate is sandwiched between a set of two mandrels and air cushions are between the upper monde/ and the upper side of the glass plate and the lower side of the glass plate and the lower mandrel, respectively.

Once the mirror plates are formed, they are removed from the slumping mandrel by means of a separate handling tool in order to be inspected and measured, then aligned and mounted into the optical module or unit structure. Considering the flexibility of these thin mirror plates, it is rather difficult to achieve the required metrology accuracy of a few arc seconds and microns. Prior art methods employ a temporary mounting of the slumped mirror plates to perform the metrology. The temporary mounting of the mirror plates is followed by a final permanent mounting of the mirror plates. However, the temporary mounting equipment may cause additional distortions to the mirror plates. This temporary mounting equipment is also required for the handling of the mirror plate during the integration of the plate into the X-ray optical module.

In the prior art, in particular for making telescopes, several alternative approaches for the handling and alignment of the mirror plate pairs prior to the final integration into the optical module have been proposed. The main proposals are the following: in a so-called "passive" approach, the mirror plates are hold in position with minimal distortions during alignment and integration into the optics module. To minimize distortions under gravity, the plate is suspended on thin wires and then bonded on the back to a temporary structure. The assembly is then used to position and align the mirror plate to the optics module structure, where it is permanently bonded. The temporary bonds to the handling structure are finally broken to release the later.

In another so-called "active alignment" approach, advantage is taken from the flexibility of the mirror plate, and out of roundness and focus adjustments are made by slightly deforming the mirror plate during the alignment. Bonding pins are first glued to the mirror plate, and these are then used to hold and position the mirror plate inside the optical module box. On-line metrology is used to measure the actual position of the plate. Once the optimal position is reached, the bonding clips are epoxied to the rails of the optical module box.

Both approaches require a box-like structure with rails to which the mirror plates are attached.

In total, a typical optical module might contain about 100 mirror pairs in e.g. a Wolter-1 configuration. A total of e.g. 60 of such modules form the complete telescope aperture. Such mirror pairs, e.g. two mirror plate stacks arranged in a tandem configuration for a Wolter-1 configuration, are usually assembled by pairwise mounting and aligning two corresponding mirrors, one of each mirror plate stacks, e.g. two mirror plate stacks are assembled in parallel.

Those prior art techniques summarized briefly above serve to satisfy the above-mentioned requirements in imperfect manner only. For example, after the slumping process, accurately placing the mirror plates onto a new separate handling tool is a difficult procedure, since the optical axis of a slumped mirror plate is hard to determine (due to the large radius of curvature and the long focal length of the plate). Additionally, a temporary mounting of the slumped mirror plates to perform the metrology followed by a final permanent mounting of the mirror plates is error-prone since the additional temporary mounting step results in additional distortions of the mirror plate under its own weight and by any inadvertent handling or frictional forces. Also, determining the plate position before the final alignment and bonding is completed does not allow for determining the final position of the mirror plates to a high degree of accuracy. Furthermore, the need for a box-like structure to fix the mirror plates during the stacking procedure does not allow for an accurate measurement of the entire figure and position of the aligned mirror plate since part of the mirror plate figure or surface are covered by the box-like mounting structure.

Furthermore, due to the difficulties of the current approaches for stacking the mirror plates, two corresponding mirror plate stacks, i.e. two mirror plate stacks later to be combined into an optical unit such as a Wolter-1 configuration, are assembled in parallel by pairwise mounting and aligning two corresponding mirrors of each mirror plate stacks. However, the critical alignment between the two mirror plate stacks can therefore only be conducted at the time of stacking, using only visible optical metrology which makes it difficult to accurately align the two mirror plate stack relative to each other. It is a further disadvantage in some prior art methods of that only a small fraction of the mirror is sampled and accessible to metrology during the alignment since the mirror area that is exposed via the slots of the conventional handling tools are limited.

Therefore there is a need to solve the above mentioned issues by providing a method for assembling mirror plates to form a mirror plate stack with higher accuracy and by providing a method for aligning and assembling two or more mirror plate stacks into an optical unit with higher accuracy.

In view of the above problems of the prior art, it is an object of the invention to provide a method of higher accuracy for assembling a mirror plate stack comprising a plurality of mirror plates and a base plate onto which the plurality of mirror plates are stacked. It is a further object of the invention to provide a method of higher accuracy for assembling an optical unit comprising at least two optical mirror plate stacks.

These objects are accomplished by the subject-matter according to the method of claim 1, claim 14 and claim 17. The dependent claims refer to preferred embodiments of the invention.

According to an aspect of the invention, a method for assembling a mirror plate stack comprising a plurality of mirror plates and a rigid base plate onto which the plurality of mirror plates are stacked is proposed. The plates, including the base plate, i.e. the plate at what is called the "bottom" or the "top" of the stack, can be shaped in such a manner that the front reflecting faces thereof have a well-determined shape. In other words, the mirror plates may have a light curvature and/or the shape of coaxial shells. The method comprises the steps of providing a base plate to which mirror plates are mounted. The base plate serves as a rigid carrier plate or structural substrate onto which the mirror plates are assembled. By way of example, the mirror plates may be glass mirror plates but the present invention is not restricted thereto. The mirror plates could equally well be, for example, silicon, metal, metal alloys, ceramics, or glass-ceramics mirror plates. The method further comprises the step of providing a handling tool with a second mirror plate. The method further comprises the step of providing a spacer to a first surface of the second mirror plate. Preferably, the spacer is formed as spacer ribs. The ribs may constitute integral portions of the plates or they may be made separately.

The method further comprises the step of positioning the handling too; comprising the second mirror plate with the spacer to align the second mirror plate with the first mirror plate, wherein the second mirror plate is aligned relative to the first mirror plate based on a measured position and shape of the first mirror plate to compensate a deviation of the measured position and shape of the first mirror plate from a pre-defined position and shape of the first mirror plate. In other words, after a $n^{th}$ mirror plate has been mounted, its position and shape is measured to determine any deviation from a pre-defined position on the plate stack and shape of the $n^{th}$ mirror plate. The mirror plate shape may comprise the plate geometry and figure. The measured position and shape of the $n^{th}$ mirror plate may then be used for the subsequent positioning and mounting of the following $(n+1)^{th}$ mirror plate to compensate the measured errors or deviation of the position and shape of the preceding $n^{th}$ plate. Thus, by using the metrology data acquired on the preceding plate when positioning and aligning the following plate, an accumulation of errors in the stacking process is avoided.

The method further comprises the step of attaching the second mirror plate to the first mirror plate by bonding the spacer to the first mirror plate, wherein the spacer determines a pre-defined distance between the first and the second mirror plates. The method further comprises the step of exposing a second surface of the second mirror plate by removing the handling tool from the attached second mirror plate. The method further comprises the step of measuring the position and shape of the attached second mirror plate after the second surface of the second mirror plate has been exposed. The first surface of the second mirror plate comprises the spacer and is facing the preceding plate and mounted thereto, whereas the second surface of the second mirror is fully exposed and accessible for metrology after the handling tool has been removed.

It is advantageous, that the actual plate position and shape is determined after the alignment and bonding is completed, thus preventing mirror plate measurements from being distorted by further mounting procedures in case a temporary mounting was used. The final position and shape of the mounted mirror plates can therefore be measured more accurately.

Since no box-like mounting structure is used, the complete surface of the mirror plate that has been mounted to the preceding plate is exposed and excessible for measurement, preferably using optical metrology or profilometers to accurately measure the position and shape of the mirror plate. The measured position and shape of a mirror plate may be used for the subsequent positioning of the following plate to compensate any deviation from a pre-determined position and shape of the assembled second mirror plate.

According to the above, the mounting of a mirror plate to a preceding mirror plate is described, wherein the preceding mirror plate has been already mounted. According to another aspect of the invention, these steps may be repeated to stack a plurality of mirror plates onto the base plate so that at least a third mirror plate is attached to the second mirror plate. By way of example, a mirror plate stack may comprise 20 to 30 mirror plates.

For assembling a first mirror plate directly to the base plate, the method may further include the following steps: providing the base plate; providing the handling tool with the first mirror plate; providing a spacer to a first surface of the first mirror plate; positioning the handling tool comprising the first mirror plate with the spacer for aligning the first mirror plate with the base plate; attaching the first mirror plate to the base plate by bonding the spacer to the base plate; exposing a second surface of the first mirror plate by removing the handling tool from the attached first mirror plate; and measuring the position and shape of the first mirror plate after the second surface has been exposed.

In other words, the assembly of the first mirror plate onto the base plate differs from the assembly of a subsequent mirror plate mainly in that the first mirror plate is aligned relative to the base plate itself and mounted directly thereon.

According to another aspect of the invention, the thickness of the mirror plates is small compared to the mirror area and may be 1 mm or less at a given mirror surface area of, for example, 300 $cm^2$.

Rib spacing is to be chosen according to the required angle, resolution, material properties and dimensions.

Preferably, the mirror plates are aligned by means of mechanical and optical alignment methods that utilize reference items provided on the handling tool and the base plate. The mechanical and optical alignment methods do achieve the required accuracy. Typically, the size is in the order of 1 arc second and 1 micron.

By way of example, the reference items may be optical mirrors for a precise angular measurement or surface marks for mechanical/tactile scanning. These reference items may also be used for the above-mentioned step of measuring the position and shape of the attached second mirror plate after the second surface of the second mirror plate has been exposed.

According to another aspect of the invention, the base plate onto which the mirror plates have been stacked may be used as a carrier plate for interfacing the mirror plate stack with an optical bench. It is advantageous that the base plate or "backplane" is not only designed and used as a temporary tool during stacking only, but the optical module base-plate used during the stacking process itself can also be retained and used as a structural element to later interface the mirror plate assembly to an optical bench or to another mirror plate stack. In other words, the bonding of all mirror plates during the integration process, including the first one attached directly to the base plate, is permanent. It is therefore an advantage of the present invention that only one precision base plate is required. It is a further advantage of the invention that the plates are automatically aligned to the optical module structural interfaces upon completion of the plate integration. The above-mentioned advantages are of particular importance for large systems comprising a plurality of mirror plate stacks. The savings in the production of precision parts and in alignment processes are significant.

According to another aspect of the invention, in the step of measuring the position and shape of the attached mirror plate after the second surface has been exposed, the position and shape may be measured using metrology or profilometers. Preferably, the optical methods to measure the position and shape include Computer generated holography and interferometry. The position and shape may be measured to the required accuracy, preferably as less than 1 arc second and less than 1 micron.

According to another aspect of the invention, the handling tool may be a mandrel, and the method may further comprise the step of forming and/or fabricating the mirror plate to a pre-defined shape by means of the mandrel. Depending on the plate material, various types of mandrels exist for slumping, electro-forming or fabricating the plate to a pre-defined shape. According to another aspect of the invention, the mirror plates may also be obtained by electroforming. According to another aspect of the invention, the mirror plates may be glass mirror plates and the mandrel may be a glass slumping mandrel. In other words, the initially flat mirror sheets, e.g. made of glass, are formed into the required shape by placing them on a properly shaped mandrel. The mandrel and the mirror sheet are then heated in an oven to the temperature, at which the sheet softens and bends under its own weight. The temperature is low enough for the sheets to keep their surface finish, but high enough for the sheets to conform to the shape of the supporting mandrel.

Using the same tool for forming the initially flat mirror sheets into the pre-determined form as well as for positioning and aligning the formed mirror plate with the base plate and/or a preceding mirror plate already mounted into the plate stack, allows to increase the stacking accuracy and to reduce costs. After the slumping process, the formed mirror plate is already precisely aligned on the handling tool. The optical axis of the handling tool (being the mandrel for forming the mirror plate) is known to large accuracy, and therefore also for the mirror plate. By positioning and aligning the formed directly by means of the mandrel avoids additional distortions and the handling errors that would result from moving the formed mirror plate to another handling tool. By way of example, an additional handling procedure, such as suspending the plate on thin wires and bonding it to a temporary structure or gluing bonding clips to the mirror plate to position the mirror plate can be avoided which could distort the thin mirror plates by any inadvertent handling or simply by the mirror plate's own weight.

It is also possible to use glass plates formed by slumping in a gas flow between mandrels, according to the above mentioned approach of the prior art, for example. In this case the glass plate has to be positioned onto the handling tool.

According to another aspect of the invention, the method may further comprise the step of removably attaching the second surface of the mirror plate to the handling tool by means of a separation layer wherein a sticking coefficient of the separation layer is set to a value to hold the mirror plate in a fixed position during the step of positioning the handling tool comprising the mirror plate with the spacer means, and wherein after the step of attaching the mirror plate, the value of the sticking coefficient allows a removal of the handling tool from the attached mirror plate.

Preferably, the base plate and/or the spacer means are made of the same material as the mirror plate material. This ensures that all the components of the mirror plate stack have the same coefficient of thermal expansion (CTE) and the same optical properties. Alternatively, the base plate and the spacer may be made of a material with a coefficient of thermal expansion (CTE) that is within acceptable limits for the given thermal environment during production and operation.

According to another aspect of the invention, a method for assembling a mirror plate stack comprising a plurality of mirror plates and a base plate onto which the plurality of mirror plates are stacked is proposed, comprising the steps of placing a first mirror plate onto a mandrel; forming the first mirror plate to a pre-defined shape by means of the mandrel; attaching a spacer to a first surface of the formed first mirror plate; and using the mandrel to align the formed first mirror plate with the base plate or a mirror plate mounted thereto.

According to another aspect of the invention, a method for assembling an optical unit is proposed, said optical unit having a first optical mirror plate stack and a second optical mirror plate stack, wherein said first mirror plate stack and said second optical mirror plate stack comprising a plurality of mirror plates stacked onto a base plate. The method comprises the steps of mounting the first optical mirror plate stack and the second optical mirror plate stack via their base plates onto micro-manipulator means wherein the first and the second optical mirror plate stacks are placed in tandem, i.e. are arranged into a tandem configuration and wherein the first and the second optical mirror plate stacks can be positioned relative to each other by the micro-manipulator means. The method comprises the steps of aligning the first optical mirror plate stack relative to the second optical mirror plate stack by means of X-ray metrology.

The alignment between the first and the second mirror plate stack is conducted using X-ray metrology, wherein the actual optical performance and imaging properties of the complete system comprising the two mirror plate stacks is measured in X-rays which allows to accurately align the two stacks with respect to each other using micro-positioners holding the two plate stacks at their base plates. The alignment method intrinsically considers all the mirror plates simultaneously, and performs a direct measurement to high accuracy and fidelity. According to conventional methods, this critical alignment between the mirror plates of the first stack and the mirror plates of the second stack is conducted at the time of stacking, using visible optical metrology. This implies some potential error sources: Firstly, X-ray metrology is not possible and therefore the inferior (due to diffraction limitations) visible light metrology must be employed.

Secondly, only a small fraction of the mirror is sampled and accessible to the metrology (limited to the area exposed in the slots of handling tool). Thirdly, after the stacking, in the prior art several further steps are required until the mirror plates are permanently mounted to the optical module structure, with no further possibility to re-align the mirror plates. The X-ray metrology experiment is possible, but not necessarily required. If adequate, conventional optical and tactile methods may be applied.

According to another aspect of the invention, the method may further comprise the steps of securing the aligned position of the first optical mirror plate stack relative to the second optical mirror plate stack by connecting the first mirror plate stack and the second mirror plate stack via their base plates. Further, the joint base plates may contain also the interface for the attachment to an optical bench, for example, using isostatic mounting.

According to another aspect of the invention, the first mirror plate stack may be a mirror plate stack of parabolically shaped glass mirror plates and the second mirror plate stack may be a mirror plate stack of hyperbolically shaped glass mirror plates forming a Wolter-1 element. In other words, the two stacks placed in tandem are combining surfaces of revolution that are of parabolic and hyperbolic shape. It is a further advantage of the invention, that the alignment method, by intrinsically considering all the mirror plates simultaneously, performs a direct measurement of the most critical kink angle, i.e. the angle between the parabola and hyperbola to high accuracy and fidelity.

From the above, it can readily be understood that the invention achieves the objects it set out to achieve. In particular, and without repeating all its advantages, it makes it possible to reduce considerably the overall manufacturing costs for a mirror plate assembly while significantly improving the accuracy for assembling the mirror plate stack as well as regarding the mounting of two or more mirror plate stacks into an optical unit, such as an Wolter-1 configuration.

This makes it possible to make telescopes of higher accuracy but without any corresponding excessive increase in costs. Nevertheless, it should be clear that the invention is not restricted to assembly of mirror plates but also cover any thin plate assembly, including thin plates with surfaces that are not optical. The above described mirror plate assembly method is in particular suitable for assembling mirror plate stacks for use in high-performance X-ray optics, e.g. to assemble a glass X-ray optical unit. The present invention, however, is not restricted thereto. The invention finds applications in numerous other fields. Mirror plate stacks and optical units assembled according to this invention may also be used for high-precision UV optics for lithographic equipment, for medical diagnostic equipment, material testing and characterization equipment, or imaging X-ray fluorescence analyzers.

The above-described method for assembling an optical unit having a first optical mirror plate stack and a second optical mirror plate stack is not restricted to the assembly of Wolter telescope of type 1, i.e. the first mirror plate stack having parabolically shaped glass mirror plates and the second mirror plate stack having hyperbolically shaped glass mirror plates but is also applicable for the assembly of Wolter-2, Kirkpatrick-Baez geometries or other configurations based on the alignment of at least two mirror plate stacks positioned relative to each other.

A single stack of a multitude of plates can also be produced, as described. This could be used for point-to-point imaging and flux concentrations or collimators and utilized for lithography equipment, for example.

Finally, the numerical values given and the examples of suitable materials are provided merely by way of concrete example and do not constitute any kind of limitation on the scope of invention. They are technological selections within the competence of the person skilled in the art.

The invention is explained below in an exemplary manner with reference to the accompanying drawings, wherein FIG. 1 shows a flow diagram of steps involved in assembling a mirror plate stack according to an embodiment of the invention;

FIG. 2 shows a flow diagram of steps involved in assembling an optical unit based on two mirror plate stacks arranged in a tandem configuration according to an embodiment of the invention;

FIGS. 3*a* and 3*b* illustrates a slumping mandrel and a mirror plate before and after a slumping process;

FIG. 4 illustrates a slumped mirror plate with attached spacer ribs on a slumping mandrel according to an embodiment of the invention;

FIG. 5*a* illustrates the positioning of the slumping mandrel comprising a mirror plate with attached spacer ribs for aligning the mirror plate with a base plate according to an embodiment of the invention;

FIG. 5*b* illustrates the alignment of a mirror plate with the base plate by means of optical and mechanical alignment methods utilizing reference items on the slumping mandrel and the base plate according to an embodiment of the invention;

In step S1, a handling tool is provided with a mirror plate positioned thereon. According to a first embodiment, the mirror plate is a glass mirror plate and the handling tool is a glass slumping mandrel. In step S2, the glass mirror plate is formed to a pre-defined shape by the glass slumping mandrel. In step S3, while the formed mirror plate is still positioned on the slumping mandrel after the slumping process, spacer ribs are attached to the mirror plate surface. According to this embodiment, the steps S4-S7 describe the case where at least one mirror plate has already been assembled to a base plate. In step S4, a base plate is provided with a mirror plate mounted thereto. In step S5, the handling tool, i.e. the slumping mandrel, comprising the mirror plate with the spacer is positioned to align the mirror plate with the mirror plate that has been lastly mounted to the base plate. In step S6, the mirror plate is aligned relative to the already mounted mirror plate based on a measured position and shape of the mounted mirror plate to compensate a deviation of the measured position and shape of the mounted mirror plate from a pre-defined position and shape of the mounted mirror plate.

In step S7, the mirror plate that is still positioned on the handling tool, is attached to the mounted mirror plate by bonding the spacer ribs to the mounted mirror plate, wherein the spacer ribs determine a pre-defined spacing between the two mirror plates. In step S8, the handling tool is removed from the attached second mirror plate and thereby exposes the mirror plate surface that was in contact with the handling tool. In step S9, the position and shape of the attached mirror plate is measured after its surface has been exposed.

Figure 1:
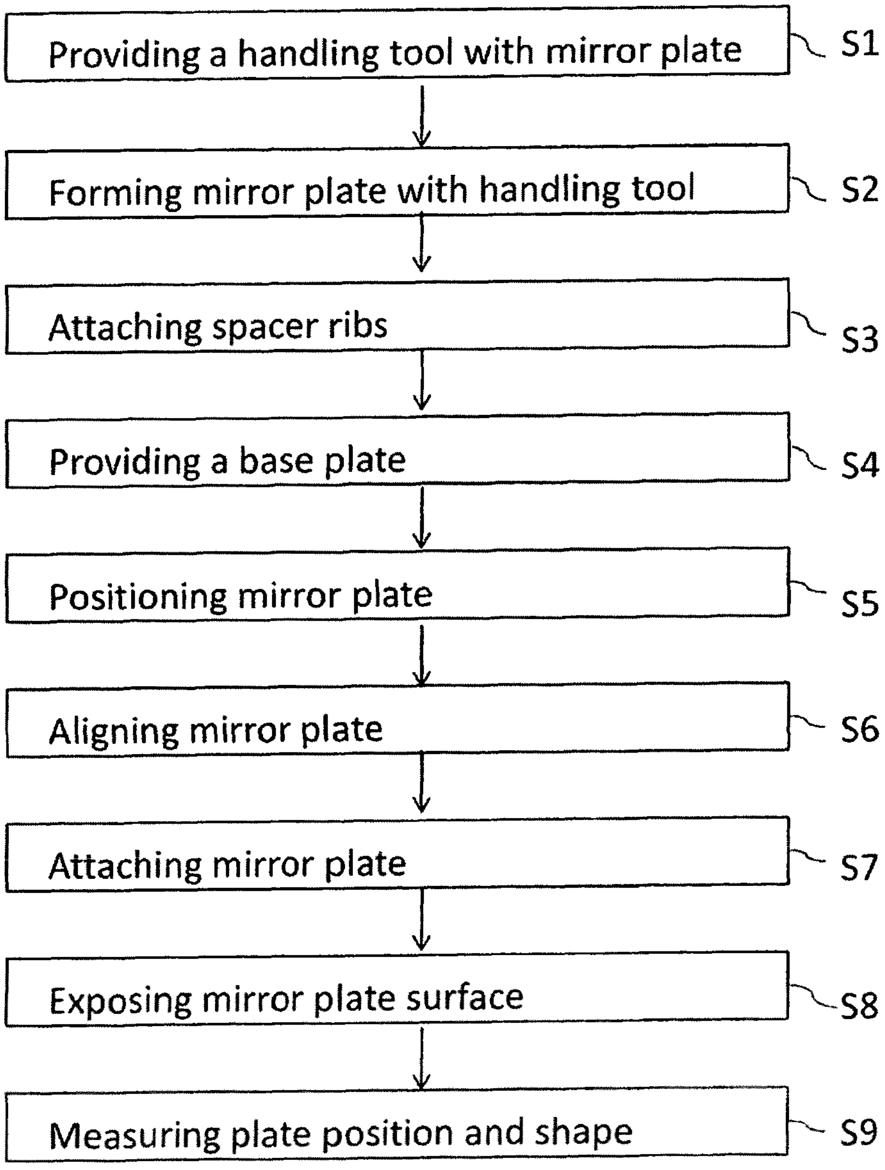
FIG. 1 shows a flow diagram of steps involved in assembling a mirror plate stack according to an embodiment of the invention.

The steps illustrated in FIG. 1 describe the assembly of two successive plates 10. This stack structure as described in FIG. 1 and in FIG. 8 constitutes an optical reflector element in accordance with the invention that can be referred to as being “minimal”. In fact, and as described below, the number of stacked plates is generally much greater, typically being of the order of a few tens. By way of concrete example, 20 to 30 plates are stacked one on another. The above-described steps S1-S9 are therefore repeated to stack a plurality of mirror plates onto the base plate.

For mounting the first mirror plate directly onto the base plate, instead of the above-described steps S4 to S7, the first mirror plate is assembled according to the following steps: the base plate is provided; the handling tool comprising the first mirror plate with the spacer ribs is positioned for aligning the first mirror plate with the base plate. Then, the first mirror plate is attached to the base plate by bonding the spacer ribs to the base plate. The attached first mirror plate is then measured according to steps S8 and S9.

The above-described sequence of steps S1 to S3 and S4 to S9 may be conducted independent from each other. In other words, using the slumping mandrel onto which the mirror plate was formed to a pre-determined shape as the handling tool for the subsequent positioning and alignment of the mirror plate (steps S1 to S3) may also be used with another method for mounting the mirror plate into a mirror plate assembly. Likewise, aligning and mounting a mirror plate into a mirror plate assembly based on the measured position and shape of a previous mirror plate does not require the use of a mandrel as the handling tool. However, the combination of both approaches results in an assembly method of higher accuracy since a mandrel is particularly suitable for accurately positioning a mirror plate relative to a preceding mirror plate already mounted into the mirror plate assembly.

Figure 2:
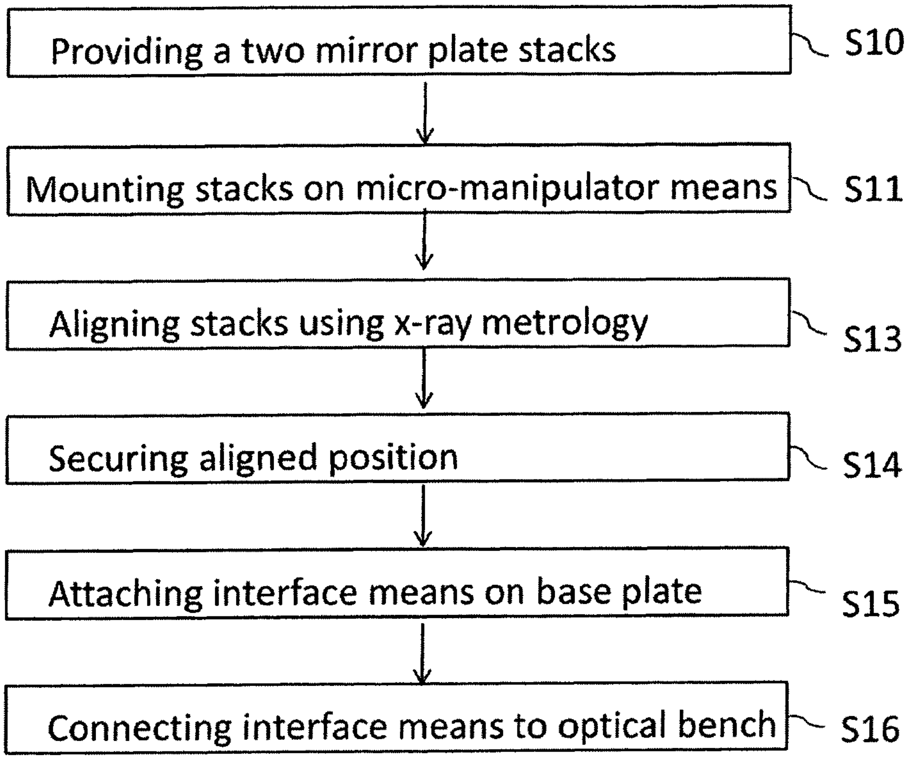

FIG. 2 shows a flow diagram of steps involved in assembling an optical unit based on two mirror plate stacks arranged in a tandem configuration according to an embodiment of the invention. In step S10, two mirror plate stacks assembled according to the method of this invention are provided. According to an embodiment, the first mirror plate stack comprises parabolically shaped glass mirror plates and the second mirror plate stack comprises hyperbolically shaped glass mirror plates. In step S11, the first optical mirror plate stack and the second optical mirror plate stack are mounted via their base plates onto micro-manipulator means wherein the first and the second optical mirror plate stacks are arranged into a tandem configuration and wherein the first and the second optical mirror plate stacks are positioned relative to each other by the micro-manipulator means. In step S13, the first optical mirror plate stack is aligned relative to the second optical mirror plate stack by means of X-ray metrology. In step S14, the the aligned position of the first optical mirror plate stack relative to the second optical mirror plate stack is secured by connecting the first mirror plate stack and the second mirror plate stack via their base plates. In step S15, interface means are attached to the connected base plates of the first and second optical mirror plate stack. In step S16, the interface means are connected by means of isostatic mounting interfaces to an optical bench.

In practice, the interface means may also be part of the base plates themselves avoiding distortions and errors during a later integration.

The following description based on FIGS. 3*a* to 11 describes the above steps in more detail.

Figure 3A:
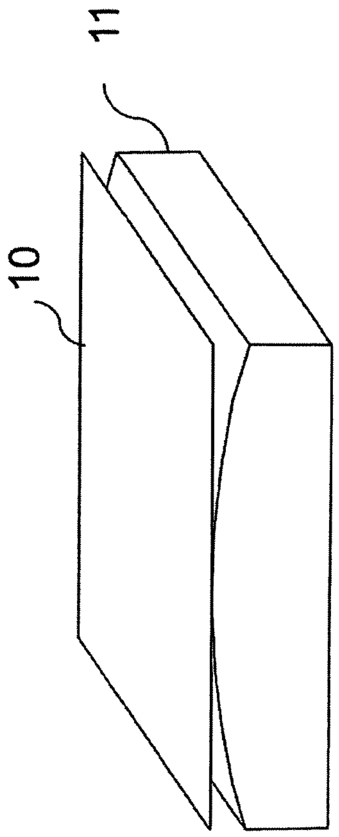
Figure 3B:
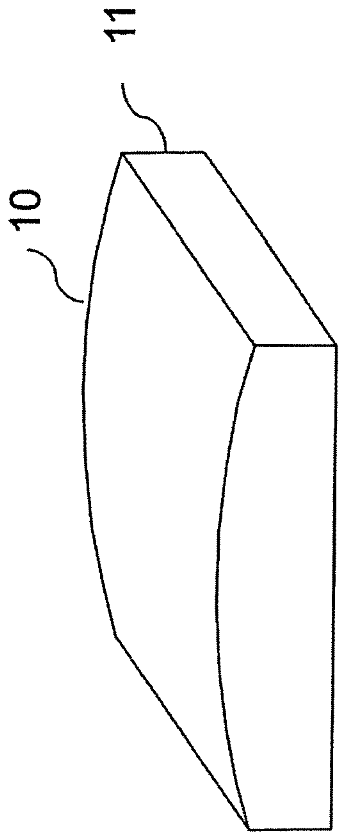

In the steps shown in FIGS. 3A and 3B, the slumping process is illustrated. FIG. 3A shows schematically a slumping mandrel 11 and a mirror plate 10 before a slumping process. The technique of glass slumping is based on the fact that the viscosity of glass changes with temperature. By increasing the temperature above the strain point it becomes soft is enough to deform under its own gravity and slumps into a given mould. The starting mirror plates 10 are display glass sheets, e.g. of type D 263 T produced by Schott. The selected glass sheets are typically the size of an A4 sheet, and between 0.3 and 0.5 mm thick. These sheets are flat, and must be formed into the required shape. The flat glass sheet 10 is placed onto a properly shaped slumping mandrel 11 and then heated in an oven to the temperature at which the glass sheet softens and bends under its own weight. The temperature is low enough for the glass sheets to keep their surface finish, but high enough for the sheets to conform to the shape of the supporting mandrel 11. Generally, a separation agent is required between the glass sheet 10 and the mandrel 11 to avoid sticking. To obtain the required X-ray reflectivity, grazing incidence angles and high-Z material coatings (e.g. Pt, Ir or Au) are used.

FIG. 3*b* shows the mirror plate 10 after the slumping process where the glass mirror plates 10 has been shaped into a pre-defined form as defined by the slumping mandrel 11. The plates 10 can be curved so that the reflecting front faces occupy a surface of predetermined shape, for example, a surface of revolution that may be parabolic, elliptical, or hyperbolic. The shape can be convex or concave.

After the slumping process, the mirror plates 10 can be made to lightly stick to the mandrel 11, by fine-tuning the separation layer composition and preparation process used to form it. In other words, the sticking coefficient of the separation agent between the glass sheet 10 and the mandrel 11 is set to a value that is strong enough to hold the mirror plate in a fixed position on the mandrel during a subsequent positioning process of the mandrel, but also light enough so that the mirror plate can be removed from the mandrel after the mirror plate has been mounted into the mirror plate stack.

Figure 4:
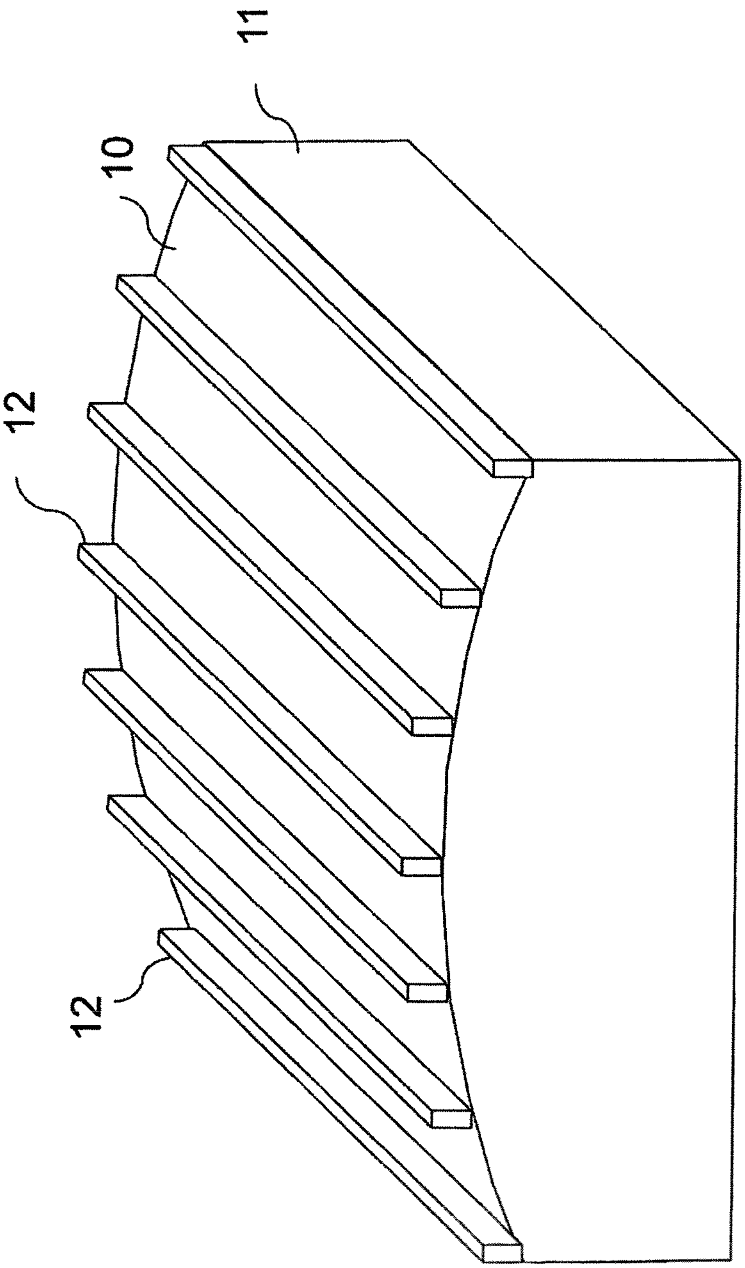

During the step shown in FIG. 4, spacer ribs 12 are attached to the slumped mirror plate 10 on a slumping mandrel 11. The ribs 12 are attached to the back of the plate when it is still on the slumping mandrel. The spacer ribs 12 are glued to the mirror plate surface so that the spacer ribs are regularly spaced apart. The ribs 12 are of the same material as the mirror plates.

Figure 5A:
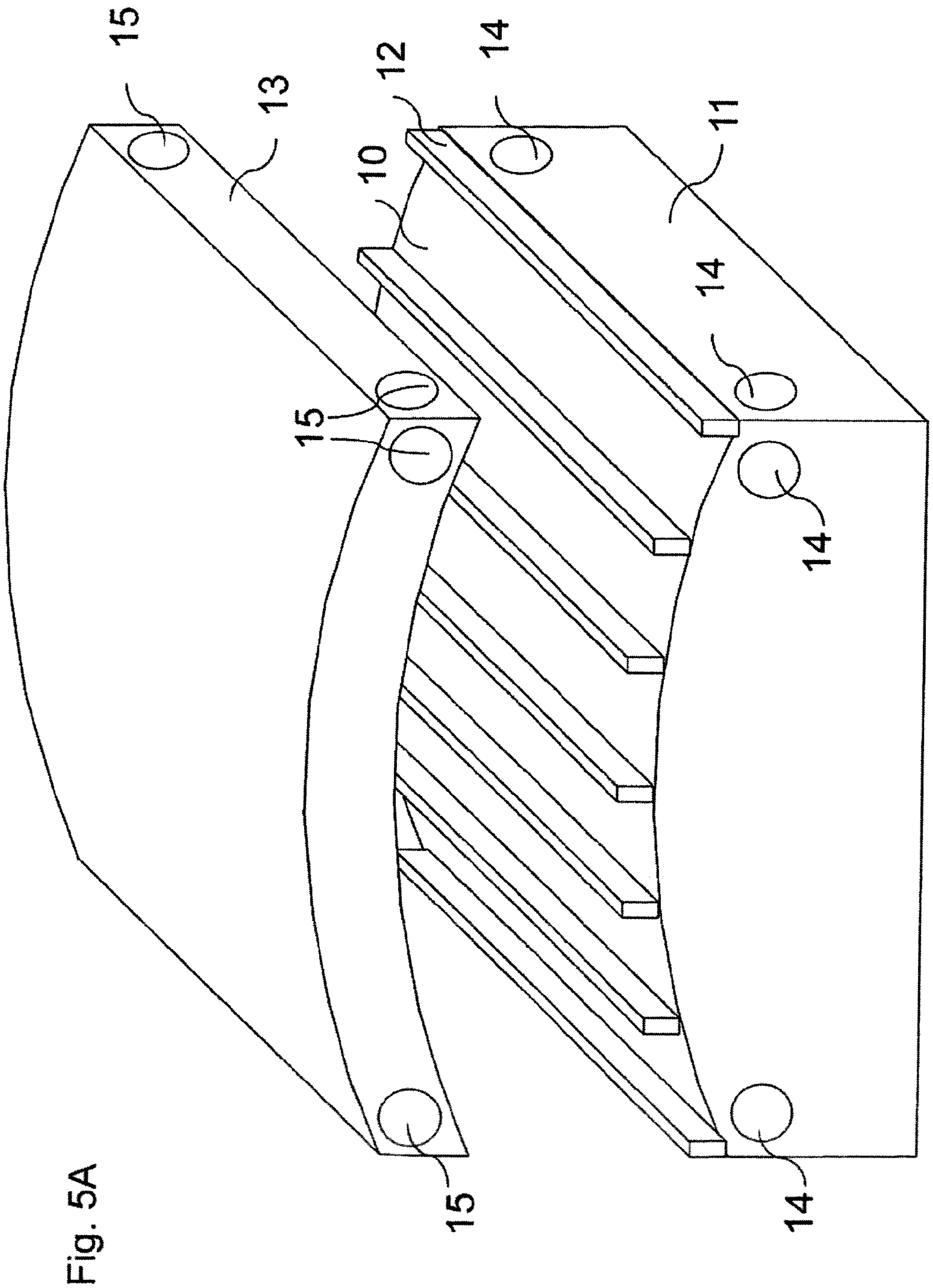

FIG. 5*a* illustrates the step of positioning of the slumping mandrel 11 comprising a mirror plate 10 with attached spacer ribs 12 for aligning the mirror plate 10 with a base plate 13. The slumping mandrel 11 serves as the handling tool for stacking the slumped mirror plate 10 into a mirror plate stack. The mandrel 11 with the lightly attached mirror plate 10 is positioned with respect to a base plate 13.

Due to the slumping process, the mirror plate 10 is already aligned on the handling tool 11, since this is the actual mandrel used to slump the plate 10 in the previous production step. The optical axis of the handling tool being the slumping mandrel 11 is known to large accuracy, and therefore also the optical axis for the mirror plate 10.

By using the mandrel 11 as the handling tool for mounting the mirror plate 10 into the mirror plate stack, an additional difficult alignment procedure which would require moving the slumped mirror plate from the mandrel 11 onto another handling tool can be avoided. Such a procedure would be error-prone since the optical axis of the plate is hard to determine due to the large radius of curvature and the long focal length of the plate.

The tuning of the sticking coefficient of the separation layer (not shown) ensures that the mirror plate adheres sufficiently to the mandrel after the slumping process, allowing the required later handling. At the same time the adhesion is light enough to permit separation from the mandrel at the required stage. Consequently, no further separate precision tool is necessary for positioning and aligning the slumped mirror plate 10, other than the slumping mandrel 11.

Figure 5B:
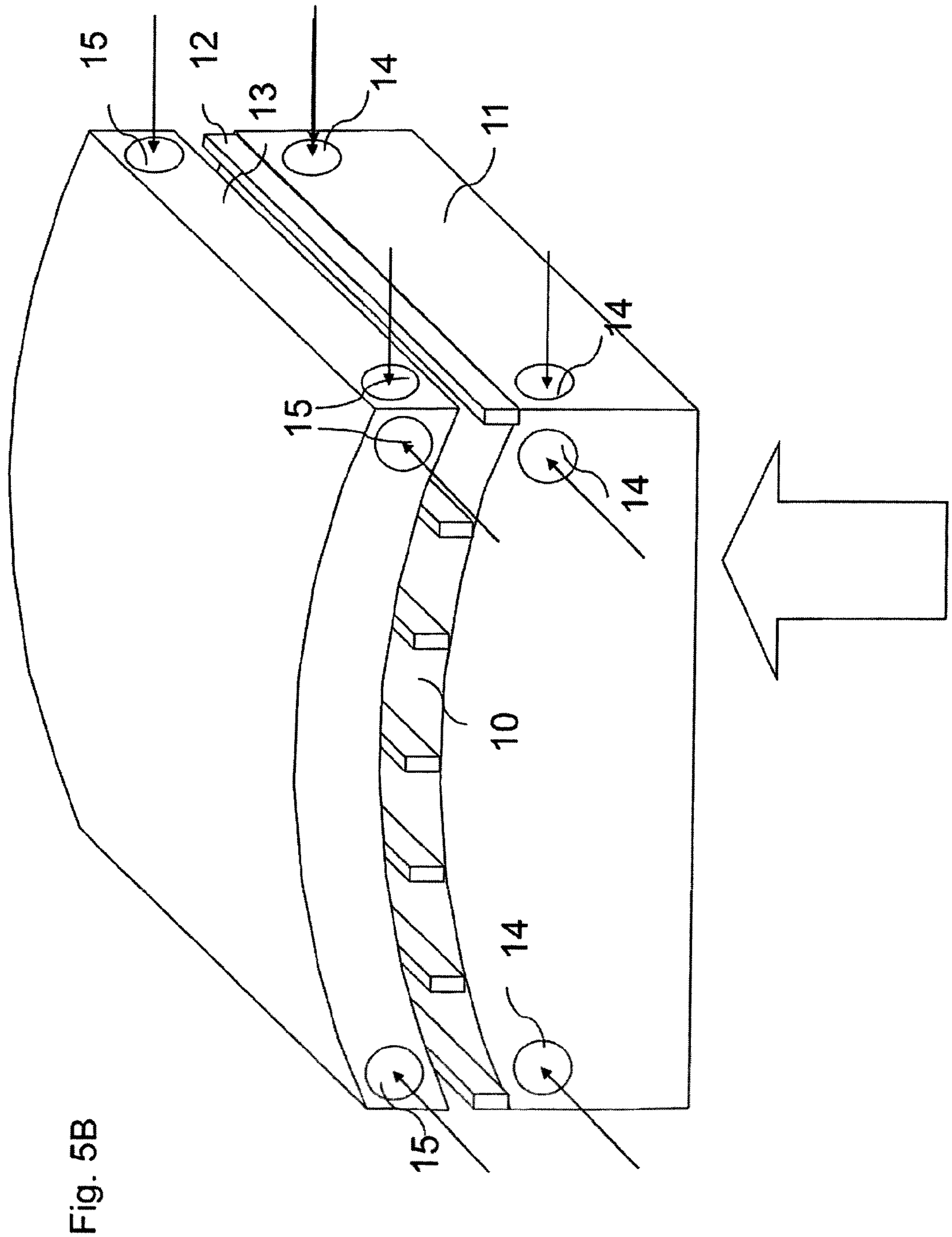

In step illustrated in FIG. 5*b*, the use of mechanical and optical alignment methods is illustrated indicated by the arrows in FIG. 5*b*. According to the invention, reference items (14, 15) on the handling tool (i.e. the slumping mandrel) and the base plate are used. Optical references, such as optical mirrors are used as the reference items. Since the geometry of the mandrel 11 and the base plate 13 is known to a large degree of accuracy, the optical mirrors can be fixed on an exact position with respect to the mandrel and the base plate. Optical references 14 are fixed on two adjacent sides of the handling tool below the surface area on which the mirror plate is positioned. Additional optical references 15 are fixed on the corresponding positions of the handling tool. The arrows in FIG. 5*b* indicate, for example, laser beams which are reflected by the optical mirrors during the alignment process of the handling tool. Using these reference items, the position of the mandrel relative to the base plate or the already assembled reference plates can be determined with the required accuracy, which may be 1 micrometer example given.

As a consequence, no groves are required in the handling tool and the original slumping mandrel can be used. By using reference items according to the invention, the metrology is not limited by the diffraction of limited small beam reflections though narrow channels (as it is the case in conventional stacking methods).

Once the mirror plate 10 is in the correct position and properly aligned with the base plate 11, as determined by the conventional metrology systems, the spacer ribs 12 are bonded to the base plate 13, or the preceding mirror plate 10 that was stacked in the previous step. A spacing between two successive plates is determined by the spacer ribs 12. Once the bond is cured, the handling tool 11 is separated from the mirror plate 10. The bonding material (e.g. glue or cement) is used to bridge any gaps. The figure of the mirror plate 10 is largely defined by the figure of the mandrel 11. Thus, the mirror plate figure is maintained by the handling tool 11, from the time the plate is thermally slumped to conform to the mandrel 11, and up to the time when the plate 10 is firmly and permanently bonded to the structural support or the previous plate.

Figure 6:
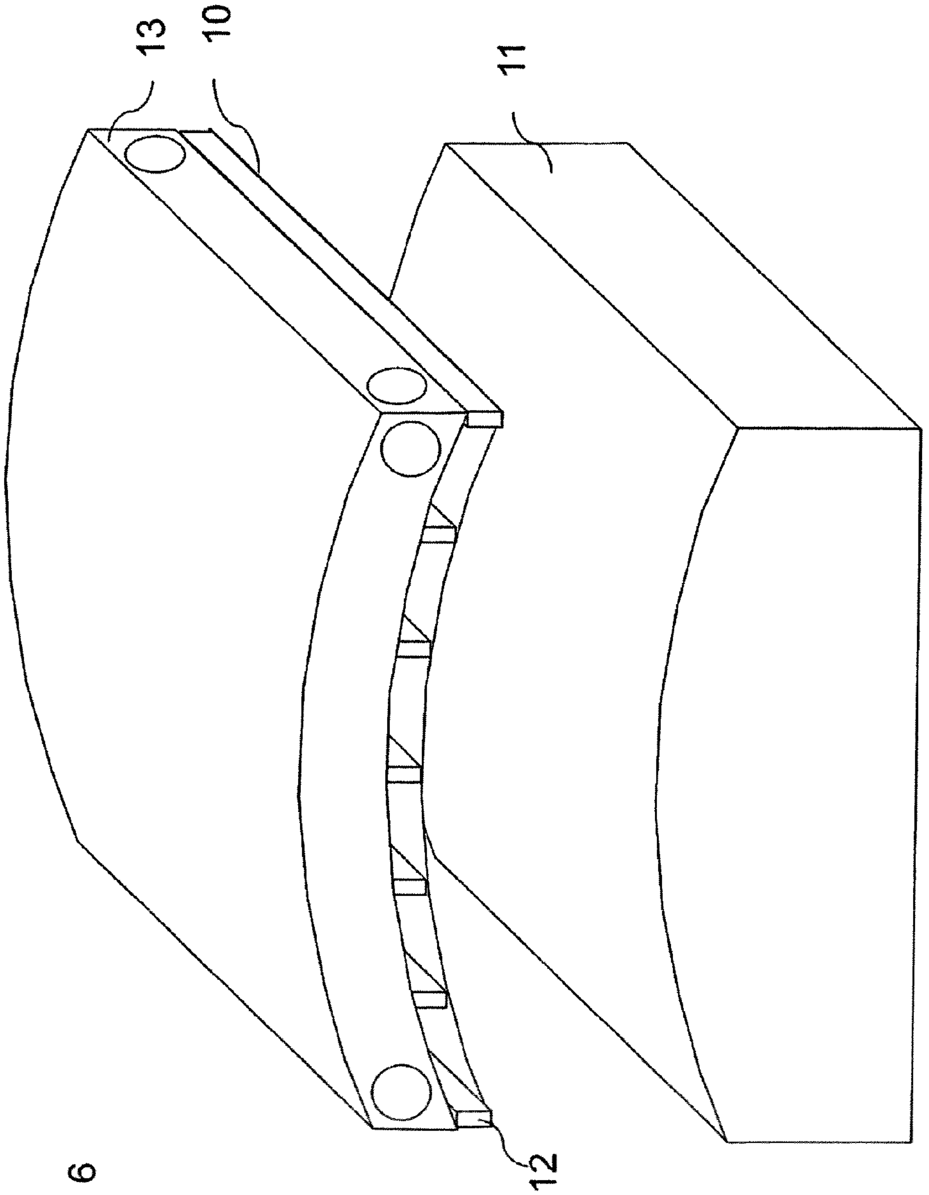
FIG. 6 illustrates a based plate comprising a mounted mirror plate and a slumping mandrel that has been removed from the mounted mirror plate according to an embodiment of the invention.

FIG. 6 illustrates a based plate comprising a mounted mirror plate and a slumping mandrel that has been removed from the mounted mirror plate 10, i.e., after the mirror plate 10 has been mounted. After the removal of the handling tool, the mirror surface previously facing the handling tool is fully exposed and available for metrology based on optical imaging or scanning methods, e.g. using computer generated holography (CGH) and interferometry. It is advantageous that the mirror surface is fully exposed and is not partly covered by an optical module box or a temporary mounting structure which would prevent an exact measurement of an entire mirror surface or figure.

Figure 7:
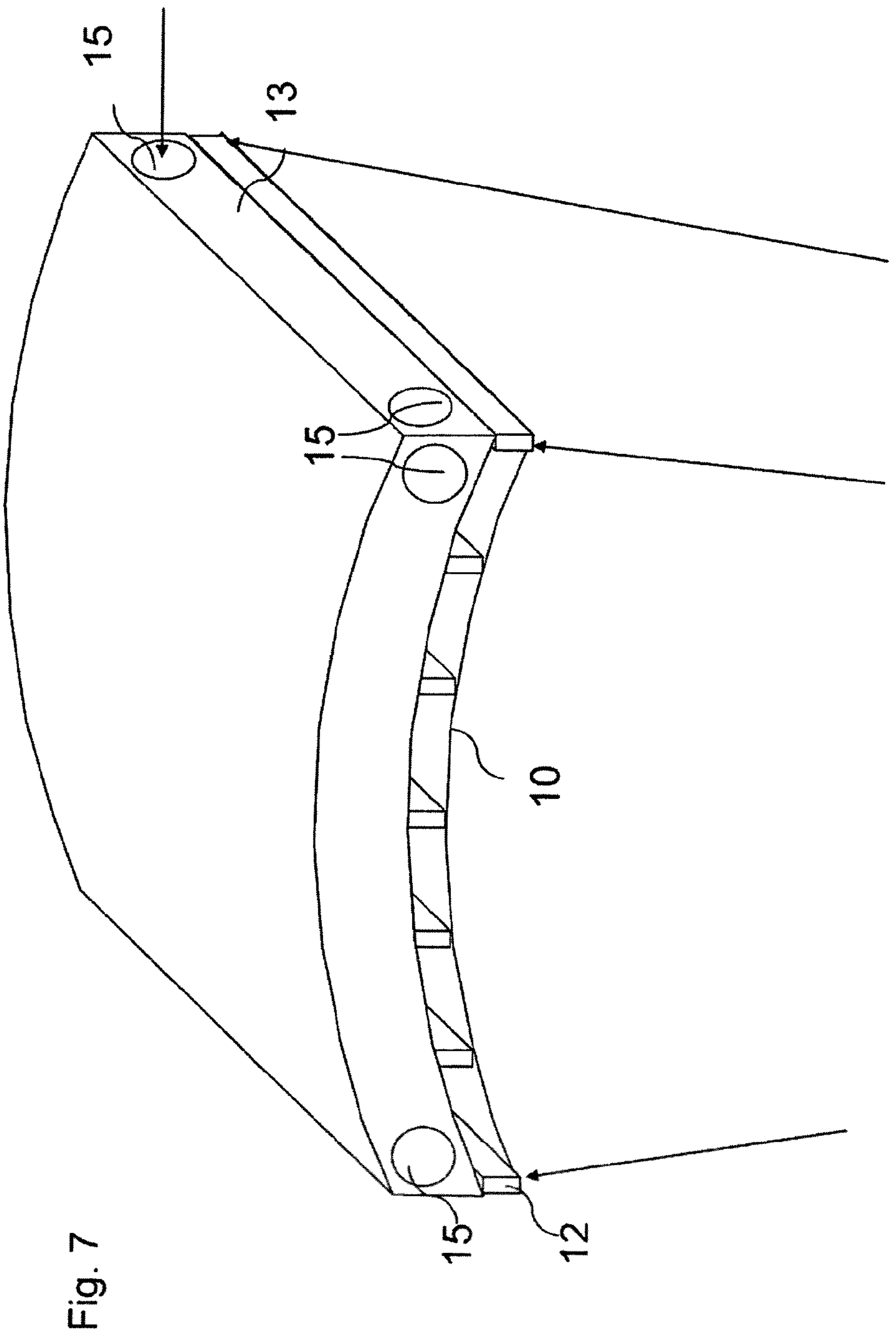
FIG. 7 illustrates the measurement of the position and figure of an exposed surface of a mounted mirror plate according to an embodiment of the invention.

In the step shown in FIG. 7, the position, topography and figure of an exposed surface of a mounted mirror plate according to an embodiment of the invention is measured. The topography can also be measured by another test method. During this measurement step, the actual mounting position of the mirror plate and any figure errors are accurately determined and recorded. The optical references 15 that have been used as reference items to position and align a mirror plate with the base plate and/or a mirror plate already mounted on the mirror plate stack are also used for measuring the position and shape of the attached mirror plate after the surface of the mirror plate that was facing the mandrel has been exposed by removing the mandrel. The difference between the desired position and figure and the actual position and figure of the mounted mirror plate determines the position and figure errors. These errors can result from the slumping process or can occur during integration of the mirror where the assembly can generate small errors of angle and small local deformations of the mirror. Based on the determined errors, an optimal position of the successive mirror plate to be mounted during the following assembly step is calculated so that the position of the successive mirror plate compensates the measured error of the previous plate. In other words, with this step the inevitable errors in positioning the preceding or previous plate ($n^{th}$ plate) are compensated when integrating the following plate ($(n+1)^{th}$ plate), i.e. the accumulation of errors in the stacking process involving many mirror plates 10 is avoided. Thus, the integration error budgets will ensure that the deviations are within tolerances for each individual plate integration.

Figure 8:
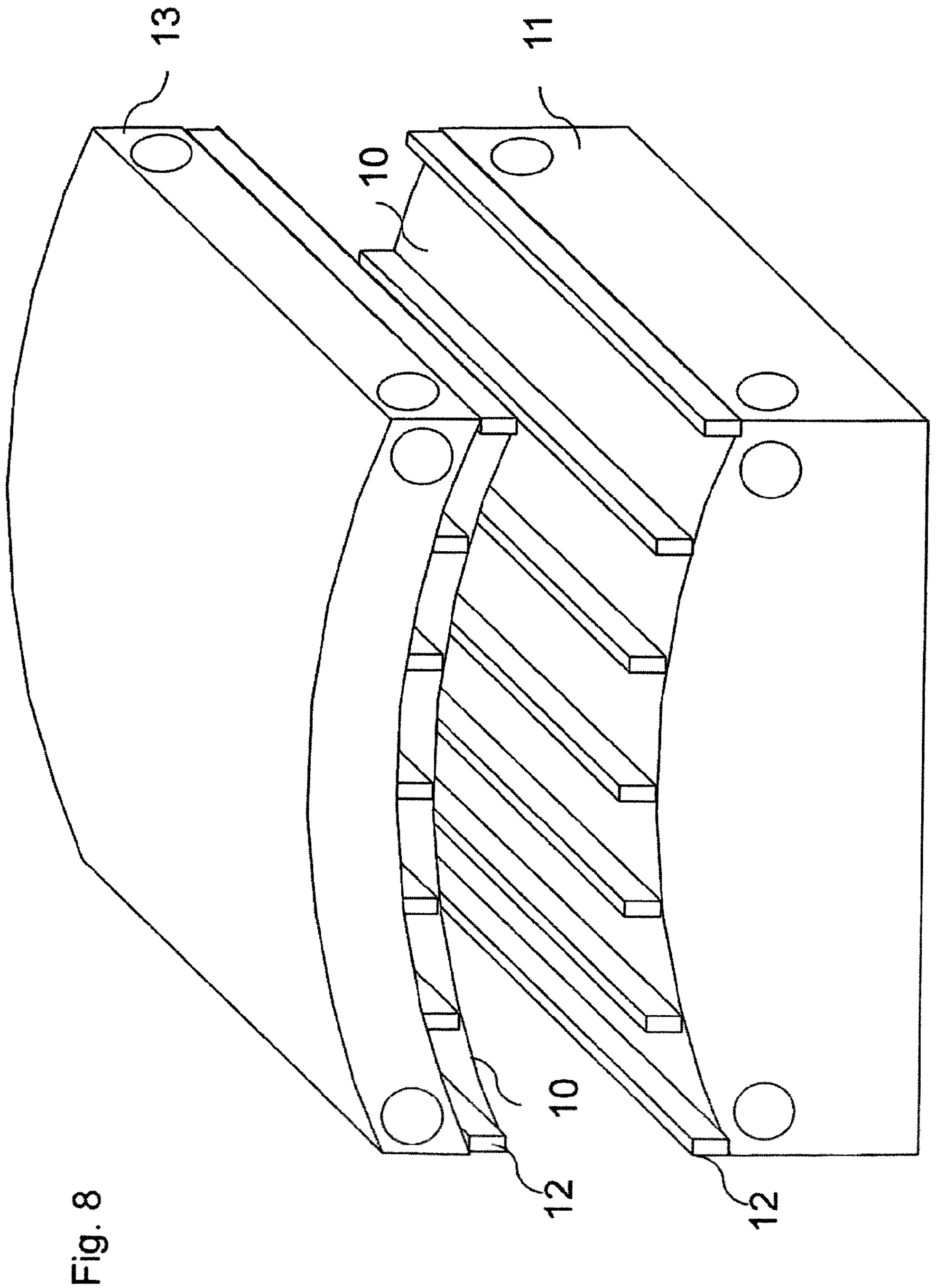
FIG. 8 illustrates the mounting of a second mirror plate to a first mirror plate already mounted to a base plate according to an embodiment of the invention.

During the step illustrated in FIG. 8, the mounting and alignment process is repeated with the next plate to be mounted onto the mirror plate stack which shows the mounting of a mirror plate 10 to another mirror plate 10 already mounted to a base plate 13.

The next mirror plate 10 is slumped on a mandrel 11, spacer ribs 12 are attached to the mirror surface that is not in contact with the mandrel surface, and then the mirror plate 10 is properly aligned with the previous plate 10, aligned and bonded. A key element is that any errors determined in the previous step (integration of $n^{th}$ mirror plate) are considered and corrected when the following $(n+1)^{th}$ mirror plate is mounted.

Figure 9:
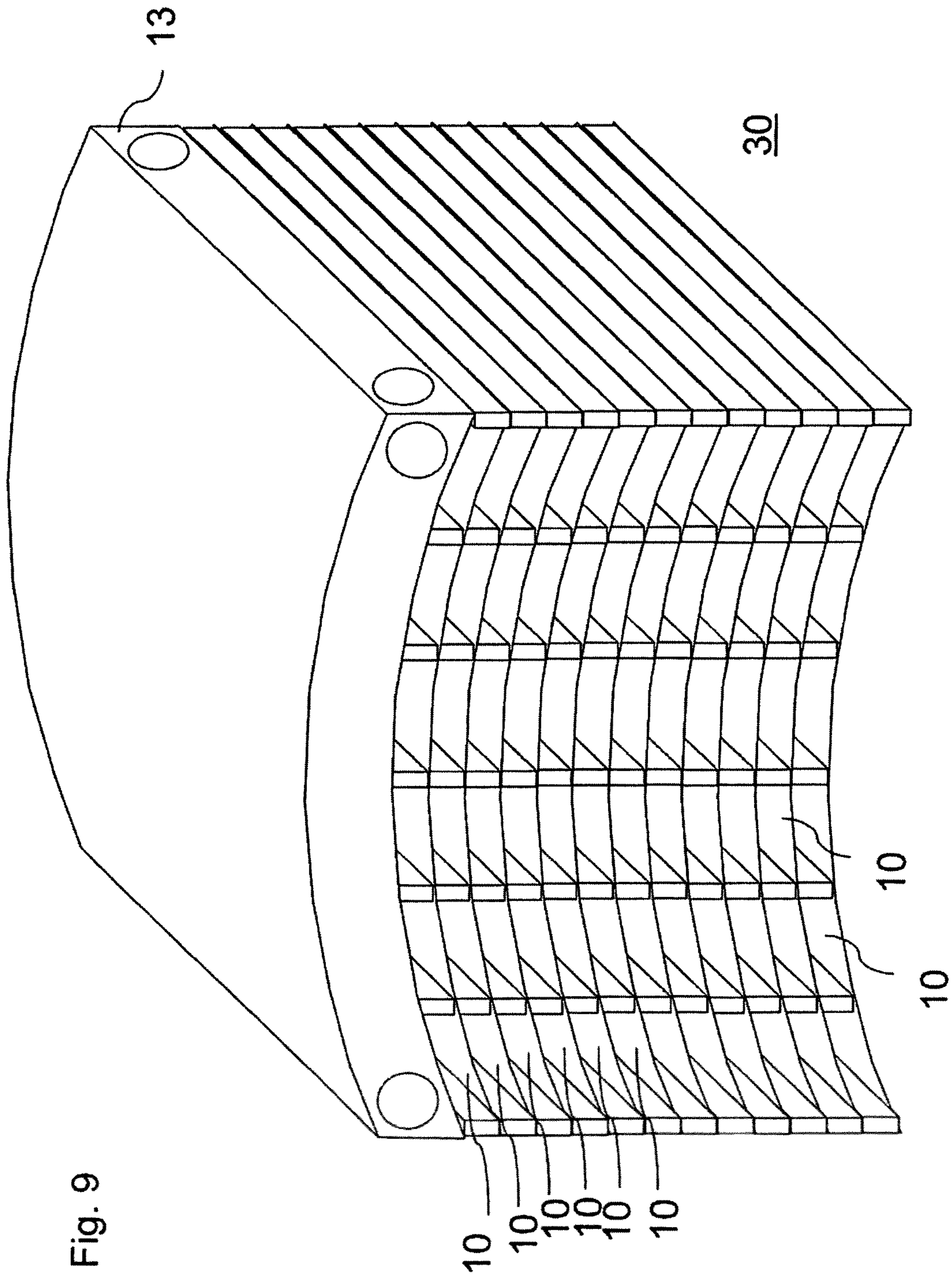
FIG. 9 illustrates an assembled mirror plate stack according to an embodiment of the invention.
Figure 10:
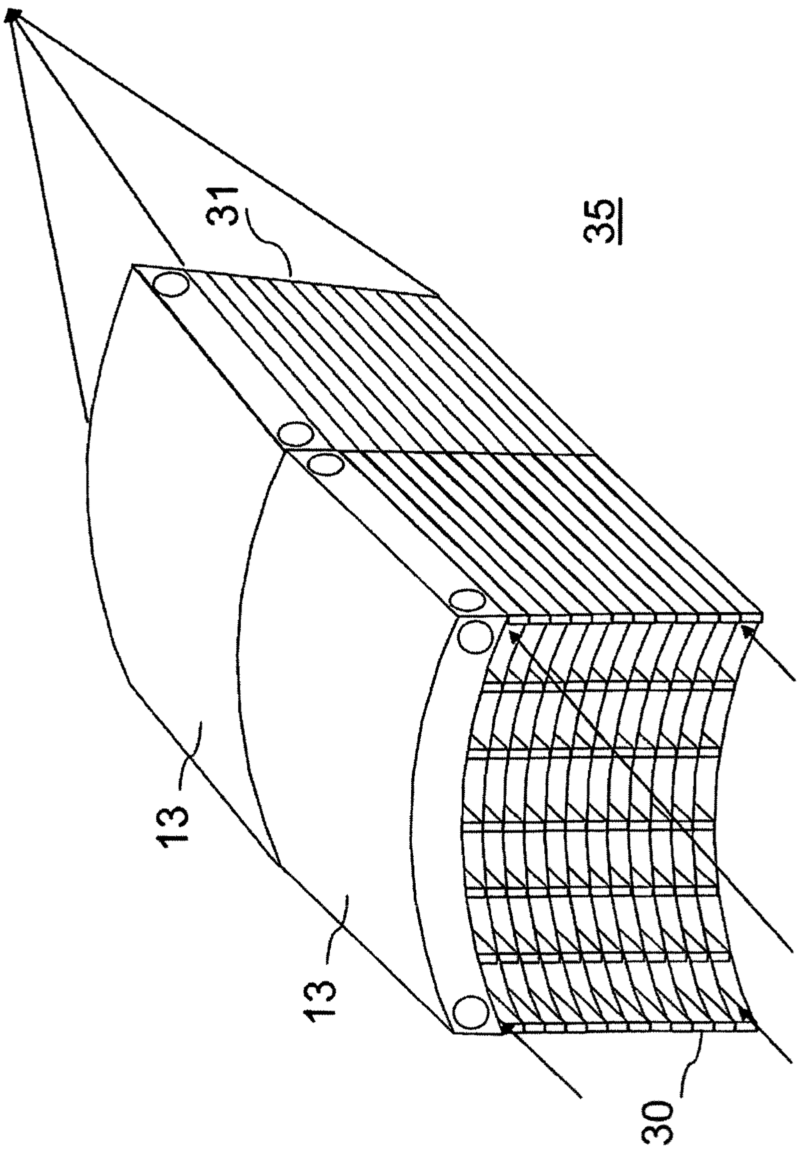
FIG. 10 illustrates the forming of a Wolter-1 element by aligning two mirror plate stacks using X-ray metrology according to an embodiment of the invention.

The process is repeated until the required number of plates is stacked and the mirror plate stack 30 is fully assembled, as illustrated in FIG. 9. The base plate or structural substrate 13, onto which the plates 10 have been stacked, is retained and used as the carrier plate for the optical module used to later to interface the mirror plate stack 30 to the optical bench. The bonding of all plates during the integration process, including the first one, is permanent. As a result, two positive effects are gained: Firstly, only one precision part is required (the optical module back plate 13) in contrast to conventional assembly approaches which require two different precision parts, i.e. the backplane and the optical module structural box. Secondly, the plates 10 are automatically aligned to the optical module structural interfaces upon completion of the plate integration. In prior art, the completed plate stack has to be removed from the tool, and then integrated with accuracy into a structural box. These advantages will be of particular importance for large telescope systems requiring a large number of optical units to be used. The savings in the production of precision parts and in alignment processes is significant.

FIG. 9 illustrates the forming of a Wolter-1 element 35 by aligning two mirror plate stacks 30, 31 using X-ray metrology according to an embodiment of the invention. To produce a Wolter-1 element 35, two stacks 30, 31 of mirror plates have to be joined together into a tandem configuration. The first stack 30 consists of parabolically shaped plates, the second stack 30 consists of hyperbolically shaped plates. The two stacks are mounted via their base-plates 13 to micro-manipulators into a tandem configuration, i.e. one mirror plate stack 31 is aligned after the other mirror plate stack 30 so that one edge and two corners of the first base plate match a respective edge and the two corners of the second base plate. The alignment of the two mirror plate stacks 30, 31 is critical and one of the most stringent parts of the error budget. In particular the longitudinal angle (along the optical axis) defining the kink-angle between the parabola and the hyperbola stacks must be accurate to a small fraction of the required angular resolution of the system e.g. for space applications with a required 5" Half Energy Widths (HEW), the kink angle must be accurate to about 1". This alignment should be conducted with respect to the X-ray effective positions and figures of the plates. According to the invention, this alignment is therefore done in an X-ray facility using on-line X-ray metrology. The imaging properties of the stack pair is measured in real time and the alignment performed using micro-positioners (not shown) holding the two plate stacks 30, 31 at their base-plates 13. Once the correct alignment is achieved within the specified tolerances, and this is confirmed by the X-ray metrology, the two stacks 30, 31 are permanently joined via their base-plates 13. The doublet now forms a Wolter-1 X-ray optical unit 35.

Since alignment of the two mirror stacks 30, 31 is done using X-ray metrology, the actual performance of the complete system (X-ray optical unit, an Wolter-1 element) is measured in X-rays, and the two stacks 30, 31 are accurately aligned with respect to each other. The alignment method intrinsically considers all the mirror plates simultaneously, and performs a direct measurement of the optical performance, including the determination of the most critical kink angle (angle between the parabola and hyperbola) to high accuracy and fidelity. In the prior art, this critical alignment between the parabolic and the hyperbolic plate is done at the time of stacking, using visible optical metrology. This implies some potential error sources: Firstly, X-ray metrology is not possible and therefore the inferior (due to diffraction limitations) visible light metrology must be employed. Secondly, in addition often only a small fraction of the mirror is sampled and accessible to the metrology (limited to the area exposed in the slots of handling tool). Thirdly, after the stacking, in the prior art several further steps are required until the mirror plates are permanently mounted to the optical module structure, with no further possibility to re-align the mirror plates.

Figure 11:
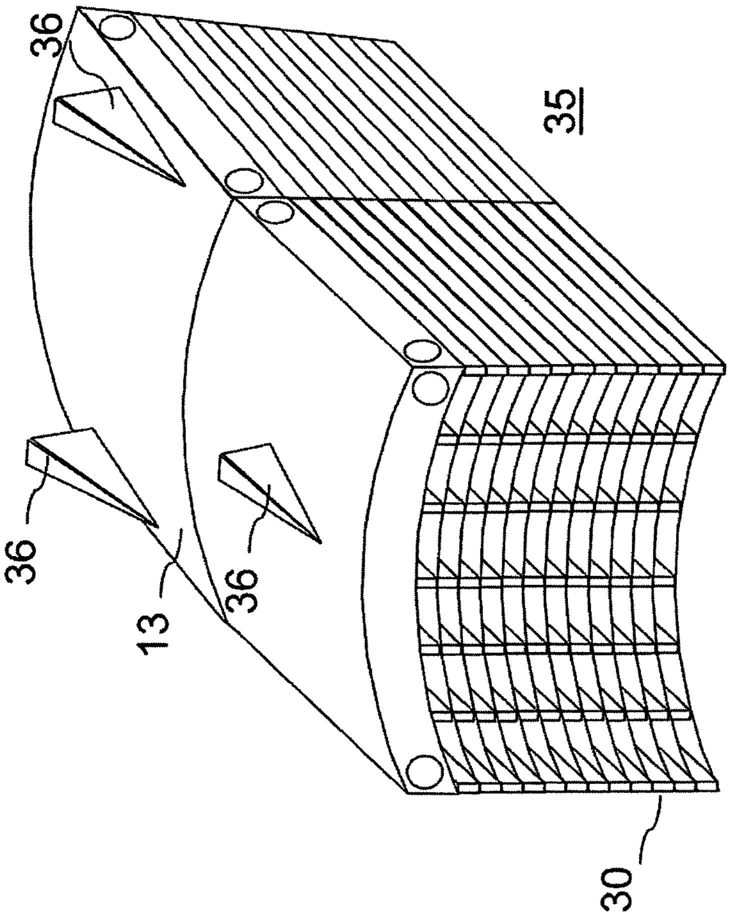
FIG. 11 illustrates an optical unit comprising two mirror plate stacks and interface means for later integration into a telescope system according to an embodiment of the invention.

FIG. 11 illustrates an optical unit comprising two mirror plate stacks and interface means for later integration into a telescope system according to an embodiment of the invention.

After the permanent joining of the parabola and hyperbola plate stacks, the final optical unit 40 is obtained, wherein the base-plates 13 form a single structural element, holding two stacks of mirror plates in precise alignment. The base plates 13 contain integrated interface elements 36. These interface elements 36 are three rigid fixing means with well defined mechanical attachment holes and surfaces. The resulting optical unit 35 is mounted onto a suitable optical bench using isostatic mounts. By using the base plates of the mirror stacks for later integration into an optical system, e.g. a telescope system, no additional complex structural boxes are required to provide the structural integrity of the optical modules.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. A method for assembling a mirror plate stack comprising a plurality of mirror plates and a base plate onto which the plurality of mirror plates are stacked, the method comprising:

providing a base plate with a first mirror plate mounted thereto;

providing a handling tool with a second mirror plate;

providing a spacer to a first surface of the second mirror plate;

positioning the handling tool comprising the second mirror plate with the spacer to align the second mirror plate with the first mirror plate, wherein the second mirror plate is aligned relative to the first mirror plate based on a measured position and shape of the first mirror plate to compensate a deviation of the measured position and shape of the first mirror plate from a pre-defined position and shape of the first mirror plate;

attaching the second mirror plate to the first mirror plate by bonding the spacer to the first mirror plate, wherein the spacer determines a pre-defined distance between the first and the second mirror plates;

exposing a second surface of the second mirror plate by removing the handling tool from the attached second mirror plate; and measuring the position and shape of the attached second mirror plate after the second surface has been exposed.

2. The method of claim 1, further comprising repeating the method to stack a plurality of mirror plates onto the base plate so that at least a third mirror plate is attached to the second mirror plate.

3. The method of claim 1, further comprising, if a first mirror plate is the first plate to be stacked onto the base plate:
providing the base plate;
providing the handling tool with the first mirror plate;
providing a spacer to a first surface of the first mirror plate;
positioning the handling tool comprising the first mirror plate with the spacer for aligning the first mirror plate with the base plate;
attaching the first mirror plate to the base plate by bonding the spacer to the base plate;
exposing a second surface of the first mirror plate by removing the handling tool from the attached first mirror plate; and
measuring the position and shape of the first mirror plate after the second surface has been exposed.

4. The method of claim 1 wherein the mirror plates are aligned using mechanical and optical alignment methods that utilize reference items provided on the handling tool and the base plate.

5. The method of claim 1 wherein the base plate onto which the mirror plates have been stacked is used as a carrier plate for interfacing the mirror plate stack with an optical bench.

6. The method of claim 1 wherein in measuring the position and shape of the attached mirror plate after the second surface has been exposed, the position and shape is measured to a required accuracy using computer-generated holography and interferometry.

7. The method of claim 1 wherein the handling tool is a mandrel, the method further comprising forming the mirror plate to a pre-defined shape by means of the mandrel.

8. The method of claim 7 wherein the mirror plates are glass mirror plates and the mandrel is a glass slumping mandrel.

9. The method of claim 1, further comprising removably attaching the second surface of the mirror plate to the handling tool by means of a separation layer, wherein a sticking coefficient of the separation layer is set to a value to hold the mirror plate in a fixed position during positioning of the handling tool comprising the mirror plate with the spacer means, and wherein after attaching the mirror plate the value of the sticking coefficient allows a removal of the handling tool from the attached mirror plate.

10. The method of claim 1 wherein the spacer comprises one or more spacer ribs.

11. The method of claim 1 wherein the base plate or the spacer means are made of a same material as the mirror plate material.

12. A method for assembling a mirror plate stack comprising a plurality of mirror plates and a base plate onto which the plurality of mirror plates are stacked, the method comprising:
placing a first mirror plate onto a mandrel;
forming the first mirror plate to a pre-defined shape by means of the mandrel;
attaching a spacer to a first surface of the formed first mirror plate; and
using the mandrel to align the formed first mirror plate with the base plate or a mirror plate mounted thereto.

13. The method of claim 12 wherein the thickness of the first mirror plate is small compared to the mirror surface area.

14. The method of claim 12 wherein the mandrel is a glass slumping mandrel and the mirror plates are glass mirror plates.

15. A device with a plurality of mirror plates wherein the mirror plates are assembled according to a method comprising:
providing a base plate with a first mirror plate mounted thereto;
providing a handling tool with a second mirror plate;
providing a spacer to a first surface of the second mirror plate;
positioning the handling tool comprising the second mirror plate with the spacer to align the second mirror plate with the first mirror plate, wherein the second mirror plate is aligned relative to the first mirror plate based on a measured position and shape of the first mirror plate to compensate a deviation of the measured position and shape of the first mirror plate from a pre-defined position and shape of the first mirror plate;
attaching the second mirror plate to the first mirror plate by bonding the spacer to the first mirror plate, wherein the spacer determines a pre-defined distance between the first and the second mirror plates;
exposing a second surface of the second mirror plate by removing the handling tool from the attached second mirror plate; and
measuring the position and shape of the attached second mirror plate after the second surface has been exposed.

16. The device of claim 15 wherein the method further comprises repeating the method to stack a plurality of mirror plates onto the base plate so that at least a third mirror plate is attached to the second mirror plate.

17. The device of claim 15 wherein the method further comprises, if a first mirror plate is the first plate to be stacked onto the base plate:
providing the base plate;
providing the handling tool with the first mirror plate;
providing a spacer to a first surface of the first mirror plate;
positioning the handling tool comprising the first mirror plate with the spacer for aligning the first mirror plate with the base plate;
attaching the first mirror plate to the base plate by bonding the spacer to the base plate;
exposing a second surface of the first mirror plate by removing the handling tool from the attached first mirror plate; and
measuring the position and shape of the first mirror plate after the second surface has been exposed.

18. The device of claim 15 wherein the mirror plates are aligned using mechanical and optical alignment methods that utilize reference items provided on the handling tool and the base plate.

19. The device of claim 15 wherein the base plate onto which the mirror plates have been stacked is used as a carrier plate for interfacing the mirror plate stack with an optical bench.

20. The device of claim 15 wherein in measuring the position and shape of the attached mirror plate after the second surface has been exposed, the position and shape is measured to a required accuracy using computer-generated holography and interferometry.

21. The device of claim 15 wherein the handling tool is a mandrel, the method further comprising forming the mirror plate to a pre-defined shape by means of the mandrel.

22. The device of claim 21 wherein the mirror plates are glass mirror plates and the mandrel is a glass slumping mandrel.

23. The device of claim 15 wherein the method further comprises removably attaching the second surface of the mirror plate to the handling tool by means of a separation layer, wherein a sticking coefficient of the separation layer is set to a value to hold the mirror plate in a fixed position during positioning of the handling tool comprising the mirror plate with the spacer means, and wherein after attaching the mirror plate, the value of the sticking coefficient allows a removal of the handling tool from the attached mirror plate.

24. The device of claim 15 wherein the spacer comprises one or more spacer ribs.

25. The device of claim 15 wherein the base plate or the spacer means are made of a same material as the mirror plate material.

* * * * *